(12) United States Patent
McKee et al.

(10) Patent No.: US 6,580,360 B1
(45) Date of Patent: Jun. 17, 2003

(54) SMART TABLE

(75) Inventors: Philip R. McKee, Frisco, TX (US);
Bobby Wong, Carrollton, TX (US);
Eric J. Moeller, Plano, TX (US)

(73) Assignee: DigiBot, Inc., Addison, TX (US)

( * ) Notice: Subject to any disclaimer, the term of this patent is extended or adjusted under 35 U.S.C. 154(b) by 257 days.

(21) Appl. No.: 09/735,761

(22) Filed: Dec. 13, 2000

(51) Int. Cl.⁷ .............................................. N01N 85/28
(52) U.S. Cl. .............................. 340/286.09; 340/311.1; 340/321; 340/540; 340/541; 340/825.08; 340/825.29
(58) Field of Search ................................. 340/540, 541, 340/825.08, 525.28, 825.29, 286.09, 311.1, 321

(56) References Cited

U.S. PATENT DOCUMENTS

| 4,236,147 A | | 11/1980 | Calvin .......................... 340/553 |
| 4,612,535 A | | 9/1986 | Sequin et al. ................. 340/539 |
| 4,800,540 A | | 1/1989 | Annala ......................... 367/87 |
| 4,935,720 A | * | 6/1990 | Kalfoun ................. 340/286.09 |
| 4,976,337 A | | 12/1990 | Trett ............................ 187/51 |
| 5,272,474 A | * | 12/1993 | Hilliard .................. 340/825.08 |
| 5,278,764 A | | 1/1994 | Iizuka et al. ................. 364/461 |
| 5,495,077 A | | 2/1996 | Miller et al. .................... 178/18 |
| 5,594,409 A | * | 1/1997 | Shank ......................... 340/326 |
| 5,680,879 A | | 10/1997 | Sheih et al. ................. 137/240 |
| 5,699,039 A | * | 12/1997 | Korzen .................... 340/311.1 |
| 5,793,309 A | | 8/1998 | Nellson .................... 340/932.2 |
| 5,900,801 A | | 5/1999 | Heagle et al. |
| 5,939,974 A | | 8/1999 | Heagle et al. ......... 340/286.09 |

* cited by examiner

Primary Examiner—Daniel J. Wu
Assistant Examiner—Tai T. Nguyen
(74) Attorney, Agent, or Firm—Antony P. Ng; Bracewell & Patterson L.L.P.

(57) ABSTRACT

A smart table to be utilized is disclosed. The smart table includes a patron presence detector, a patron counter, a staff presence detector, and a transmitter. The patron presence detector detects information regarding the presence of patrons sitting at the table. The patron counter counts the number of patrons sitting at the table. The staff presence detector detects information regarding the presence of a staff member serving the table. The above-mentioned detected information are subsequently transmitted by the transmitter to a remotely located data processing system.

10 Claims, 6 Drawing Sheets

SMART TABLE

BACKGROUND OF THE INVENTION

1. Technical Field

The present invention relates to an apparatus for providing management support in general, and in particular to an apparatus for providing management support in restaurants. Still more particularly, the present invention relates to a smart table for providing management support in a restaurant.

2. Description of the Prior Art

The impression of a customer's visit to a restaurant depends not only on the food quality of the restaurant but also on the level of service delivered by the employees of the restaurant. When evaluating a restaurant, a customer may factor in how long it takes to be seated at a table, how long it takes for a wait staff to greet and take an order from the customer, how long it takes for the food to arrive at the customer's table, how long it takes for the wait staff to respond to common requests such as beverage refills, bread refills, etc., and how long it takes the wait staff to deliver the check to the customer's table. Thus, in order to ensure total customer satisfaction, a restaurant must provide relatively high quality in both its food and service.

The labor force in a typical restaurant, like most other service-oriented businesses, typically suffers from a very high turnover rate, which usually leads to little formal training for most restaurant employees. In addition, when there are multiple restaurants involved, an executive manager, who oversees such restaurants but infrequently visits the premises, has very little information on the day-to-day operations of each restaurant. The executive manager most likely receives only periodic and second-hand information from lower level managers who may have received the data from even lower level supervisors. As a result, there is an undesirable disconnection between the executive manager and the day-to-day operations of the restaurants such that the executive manager is not optimally equipped with information to efficiently apply his/her experience and knowledge to the day-to-day operations of the restaurants. Thus, the executive manager's extensive experience and knowledge are not effectively utilized, and as a result, the performance of the restaurant is less than optimal.

Moreover, while the process sequence at an individual table, such as seating, ordering, serving, bill presentation, and payment, is relatively predictable, the variable process start point at each table, combined with the variable duration of each process step, create a service management nightmare. Consequently, it would be desirable to provide a method and system to monitor various service qualities of a restaurant such that any manager of the restaurant can benefit from the collected and displayed information to provide better control and management of their employees throughout the day-to-day operations of the restaurant.

SUMMARY OF THE INVENTION

In accordance with a preferred embodiment of the present invention, a smart table includes a patron presence detector, a patron counter, a staff presence detector (which may also receive information from a patron survey pad), and a transmitter. The patron presence detector detects information regarding the presence of patrons sitting at the table. The patron counter counts the number of patrons sitting at the table. The staff presence detector detects information regarding the presence of a staff member serving the table. The above-mentioned detected information are subsequently transmitted by the transmitter to a remotely located data processing system.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description( of an illustrative embodiment when read in conjunction with the accompanying drawings, wherein.

DETAILED DESCRIPTION OF A PREFERRED EMBODIMENT

A. System Overview

Figure 1:
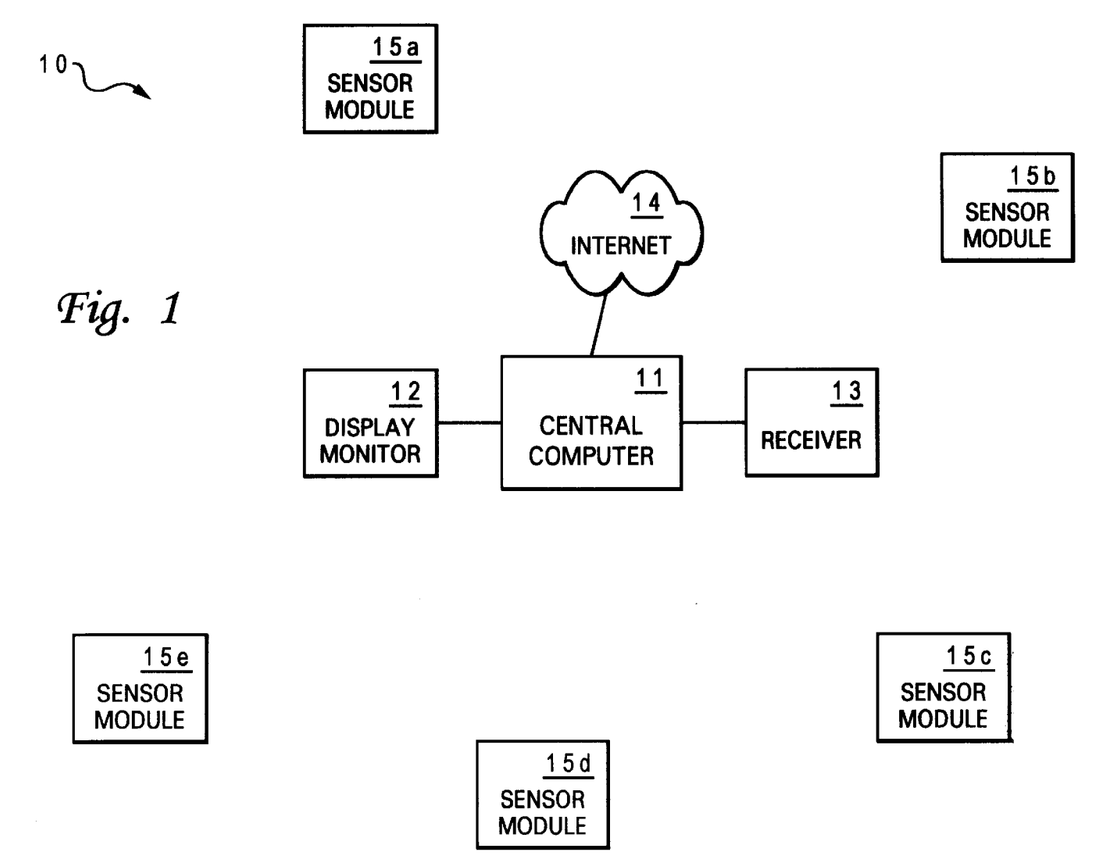
FIG. 1 is a block diagram of a monitoring system for monitoring service quality in a restaurant, in accordance with a preferred embodiment of the present invention.

Referring now to the drawings and in particular to FIG. 1, there is depicted a block diagram of a monitoring system for monitoring service quality in a restaurant, in accordance with a preferred embodiment of the present invention. As shown, a monitoring system 10 includes a central computer 11, a display monitor 12, a receiver (or transceiver) 13, and various sensor modules 15a–15e. Central computer 11 may be a personal computer, a workstation, or a processor that is capable of processing and analyzing data. Central computer 11 is also connected to a global communication network such as Internet 14 for communicating with one or more computers located at remote locations. Central computer 11 can display information, such as measurements detected by sensor modules 15a–15e, images captured by sensor modules 15a–15e, analysis data, data summary reports, graphical information, etc., on display monitor 12. Such information can be sent to any other location via Internet 14 to be displayed at that location.

Each of sensor modules 15a–15e is capable of sensing or capturing a specific type information. Several examples of sensor modules will be further described in details infra. The information detected by sensor modules 15a–15e are continuously or periodically transmitted to central computer 11 via receiver 13. Sensor modules 15a–15e communicate with central computer 11 via receiver 13 preferably over the air so that no cable or wiring is required. For example, the TMI wireless transmitter module manufactured by Glolab Corporation may be used to transmit detected signals from sensor modules 15a–15e to central computer 11. Other well-known wireless technologies may also be used for the transmission of data from sensor modules 15a–15e to central computer 11. A frequency preferably in the range of 400 MHz to 2500 MHz is utilized for data transmissions to minimize interference.

In a restaurant environment, sensor modules, such as sensor module 15a, are installed at each table, preferably hidden from the view of patrons, such as under the table. Each sensor module, which includes at least a detector (or sensor), can gather a specific type of information related to the performance and operations of a restaurant. The collected data are then sent to central computer 11 to be stored in a database within central computer 11. Within central computer 11, there are two types of data storage for the collected data. The first type of data storage allows the storing of the most recently collected data by continuously overwriting the previously collected data. A circular buffer may be used for this type of data storage. The second type of data storage occurs as a response to an exception. When a predetermined threshold or range is exceeded, central computer 11 may respond by storing all or a subset of the data for a predetermined period of time. Information in the data bases may be transmitted via Internet 14 to a remote location for storage or access.

B. Detecting Patron Presence

Figure 2:
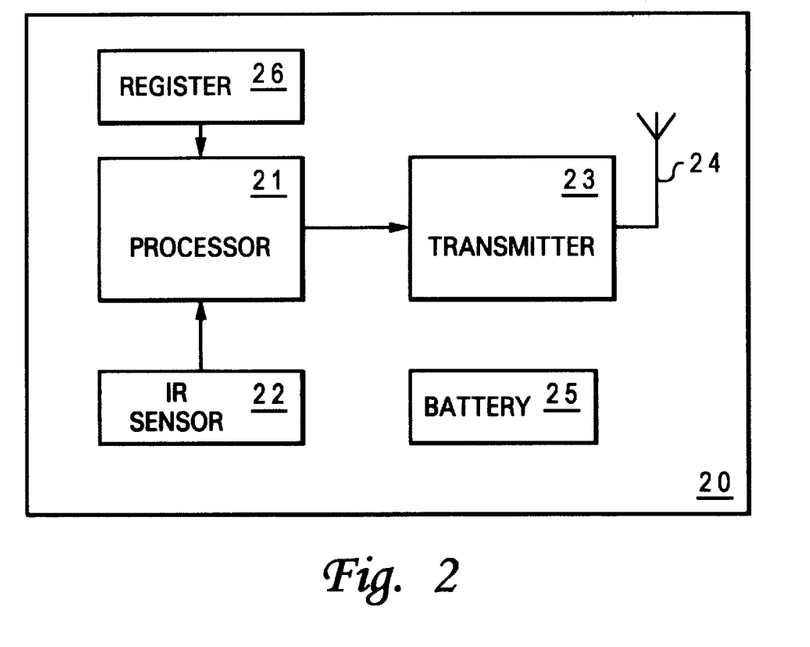
FIG. 2 is a block diagram of a patron presence detector in accordance with a preferred embodiment of the present invention.

One example of a sensor module is a patron presence detector. With reference now to FIG. 2, there is illustrated a block diagram of a patron presence detector in accordance with a preferred embodiment of the present invention. As shown, a patron presence detector 20 includes a processor 21, a passive infra-red (IR) motion sensor 22, a transmitter 23, an antenna 24, and a register 26 that can be manually programmed to store a table number. Patron presence detector 20 is preferably powered by a battery 25.

Patron presence detector 20 is capable of detecting motion in such a way as to likely correspond with the arrival of a patron. Once patron presence has been established, such information is transmitted to receiver 13 (from FIG. 1) via transmitter 23 in the form of a "patron present" signal. The transmission is preferably performed over the air via antenna 24 using radio frequency (RF) technology, but the transmission can also be accomplished by using infra-red (IR) technology if line of sight is not a problem, or by using cables if it is convenient to attach cables or wires to each table within the restaurant.

A "patron present" signal preferably includes a header and a body. The header may be an 8-bit pattern that is distinguishable from RF random noise or white noise within a restaurant. The body may be of any length and may include information such as a unique table number (obtained from register 26) in addition to a "patron present" indicator.

In order to avoid false detections, patron presence detector 20 requires multiple detections within a pre-determined period before sending a "patron present" signal. For example, if subsequent motion is detected within a pre-determined period of time after the first detection, patron presence detector 20 can conclude that a patron is at the table. Otherwise, if no motion is detected within the pre-determined period of time after the first detection, patron presence detector 20 can conclude that a false detection has occurred such that no "patron present" signal will be sent.

Patron presence detector 20 is also capable of operating in such a way as to minimize energy usage such that battery operation is possible without requiring an inordinate amount of battery checking, charging, or changing. For example, after the transmission of a "patron present" signal, the patron detector may enter a hibernation mode for a period of time that is considered the minimum reasonable amount of time a patron would stay at a particular table. This is because if it is known that a patron or patrons typically stay at a specific restaurant for a minimum of, say, 45 minutes, then once it has been established that the patron or patrons had sat down at a table, then there is no reason for the patron detector to actively operate during the 45-minute period. During the hibernation mode, patron presence detector 20 may check every 10 minutes or so to ensure the patron or patrons are still there at the table, and once the patron presence is confirmed, hibernation mode may be resumed. If not confirmed, a "patron no longer present" signal may be sent.

C. Counting Patrons

Figure 3:
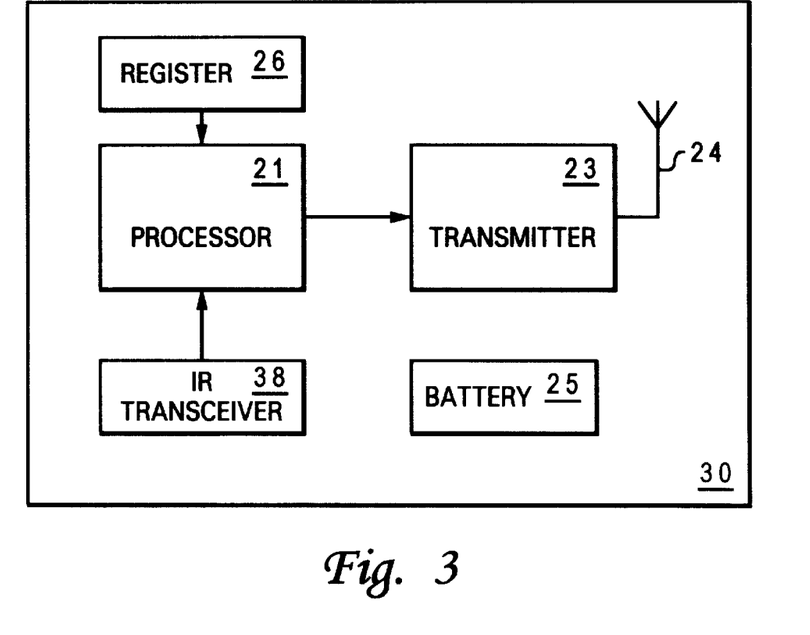
FIG. 3 is a block diagram of a patron counter in accordance with a preferred embodiment of the present invention.

Patron presence detector 20 may also be modified to become a patron counter for counting individual patrons. This is accomplished by replacing motion sensor 22 with an IR transceiver. Referring now to FIG. 3, there is illustrated a block diagram of a patron counter in accordance with a preferred embodiment of the present invention. Powered by battery 25, a patron counter 30 includes processor 21, transmitter 23, antenna 24, register 26, and an IR transceiver 38. IR transceiver 38, which includes a built-in IR source, is capable of generating IR signals. In addition, IR transceiver 38 is also capable of receiving two types of IR signals, namely, a bounce back IR signal from a human body, and a direct IR beam signal. It is also noted that IR transceiver 38 can be installed in conjunction with motion sensor 22 (from FIG. 2) such that motion sensor 22 is used to turn on IR transceiver 38 after the patron presence has been established as described supra.

Figure 3A:
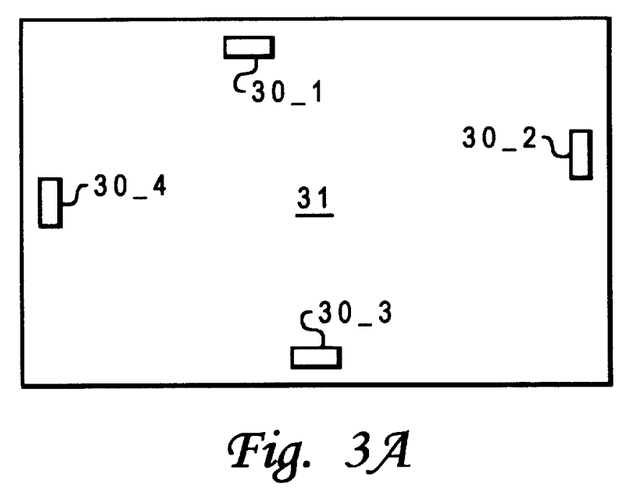
FIGS. 3a and 3b are two implementation examples of the patron counter from FIG. 3, in accordance with a preferred embodiment of the present invention.

Referring now to FIG. 3a, there is illustrated an implementation example of patron counter 30 for counting the number of patrons sitting at a rectangular table, in accordance with a preferred embodiment of the present invention. As shown, a rectangular table 31 includes four patron counters 30_1–30_4. Each of patron counters 30_1–30_4 is capable of detecting a bounce back IR signal from a human body and a direct IR beam signal. The bounce back IR signal arises from the reflection of an IR beam generated by an IR source. For example, if a patron is sitting in front of patron counter 30_2, the reflection of an IR beam generated by the IR transceiver within patron counter 30_2 from the patron's body will be received as bounce back IR signals by patron counter 30_2. Similarly, if a second patron is sitting in front of patron counter 30_3, the reflection of an IR beam generated by the IR transceiver in patron counter 30_3 from the second patron's body will be received as bounce back IR signals by patron counter 30_3. Subsequently, each of patron counters 30_2 and 30_3 will send a "patron presence" signal to central computer 11 (from FIG. 1) such that central computer 11 can register two patrons sitting at table 31. On the other hand, the direct IR beam signal arises from an IR beam generated by an IR transceiver located at a different table. With the arrangement of patron counters 30_1–30_4 as shown in FIG. 3a, the only situation that any patron counter at table 31 can receive a direct IR beam signal is when table 31 is joined with another table such that the received signal strength of the IR beam is relatively stronger than that of a bounced back IR signal.

Figure 3B:
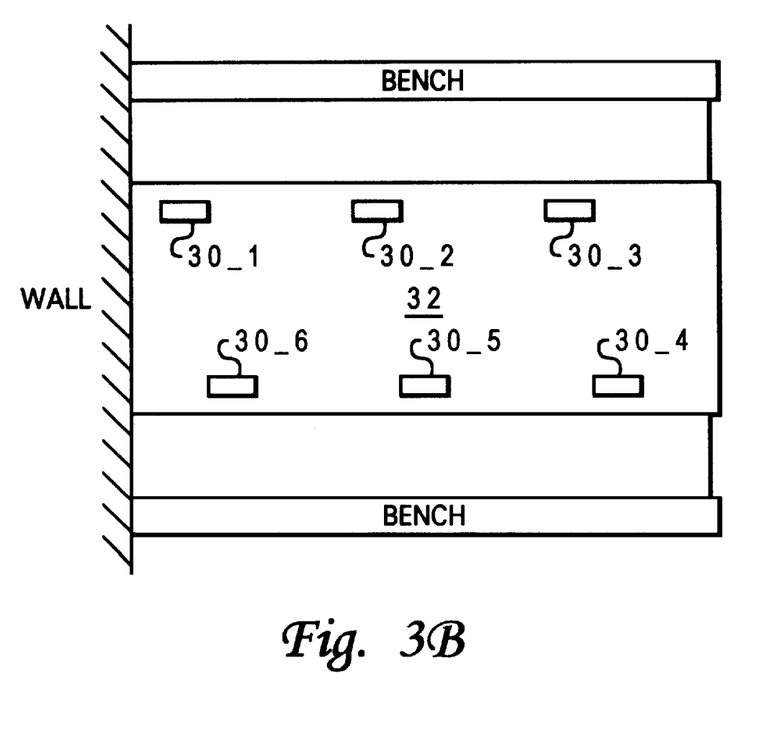

With reference now to FIG. 3b, there is illustrated an implementation example of patron counter 30 for counting the number of patrons sitting at a booth, in accordance with a preferred embodiment of the present invention. As shown, a booth 32 is intended to sit six patrons. Thus, booth 32 includes six patron counters 30_1–30_6. Each of patron counters 30_1–30_6 functions similar to those mentioned in FIG. 3a.

D. Detecting Staff Presence

Figure 4:
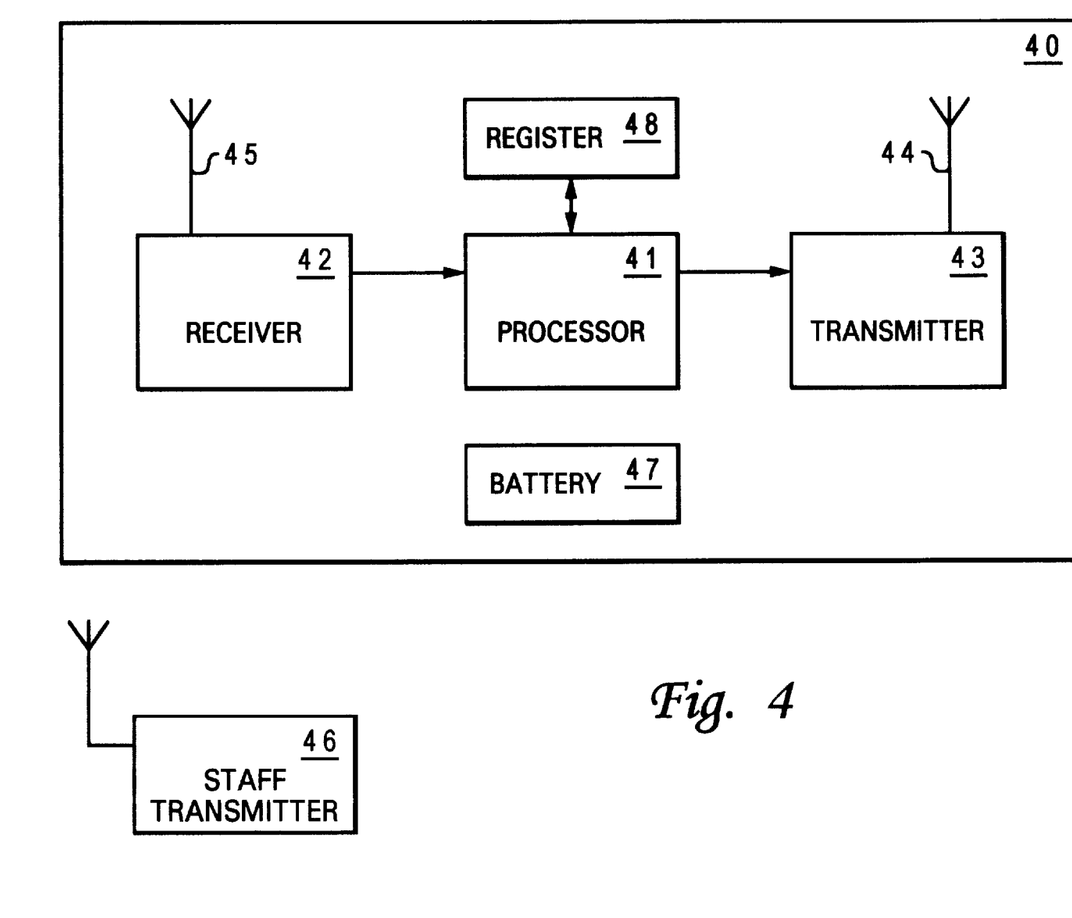
FIG. 4 is a block diagram of a staff presence detector in accordance with a preferred embodiment of the present invention.

Another example of a sensor module is a staff presence detector. With reference now to FIG. 4, there is illustrated a block diagram of a staff presence detector in accordance with a preferred embodiment of the present invention. As shown, a staff presence detector 40 includes a processor 41, a receiver 42, a transmitter 43, antennae 44, 45, and a register 48 that can be manually programmed to store a table number. Staff presence detector 40 is powered by a battery 47, and should have maximum energy efficiency in order to minimize the requirement to change or charge batteries. Thus, staff presence detector 40 should preferably be inactive until patron presence detector 20 (from FIG. 2) has detected a patron present. Staff presence detector 40 is preferably installed at a table or a service station, and detectors presence of a staff transmitter 46 that is attached to or carried by an employee of a restaurant, such as a waiter, a manager, a server, or a bus boy (described collectively as "staff" hereinafter).

Staff transmitter 46 preferably transmits a rapidly attenuating (with predictable attenuation) RF signal. Rapid attenuation is important because the RF signal being transmitted by a staff member can be successfully received and decoded at any number of receivers, such as receiver 42, when in close proximity thereto, but it should only be accepted at a receiver where it is desired to detect the staff member. In other words, the staff member should only be detected at one table instead of several tables at the same time. Specifically, the staff member should only be detected at one particular table at which the staff member is attending at a particular time. If the staff member is not attending any table, the staff member should not be detected at any table. The staff detection is accomplished by sending a RF signal that attenuates discernably after transmitting only a few feet. Accordingly, by comparing a signal received by receiver 42, which preferably includes a signal strength indicator, with a previously established threshold signal strength level, a staff member, such as a waiter, can only be recognized when the staff member is within a few feet (such as within three feet) of receiver 42, thereby indicating the staff member is attending to a particular table.

Included within the RF signal is a standard packet identifier that distinguishes the transmission from RF random noise or white noise that may be received by receiver 42, along with some information that identifies a specific waiter and any other information that may be desirable to transmit from a staff member, along with any other packet identifier, check sum or other method of designating that the transmission is complete and that the transmission packet has been properly received.

After confirming the presence of a staff member, staff presence detector 40 transmits a "staff present" signal to central computer 11 (from FIG. 1). The "staff present" signal preferably includes a header and a body. The header may be an 8-bit pattern that is distinguishable from RF random noise or white noise. The body may be of any length and may include information such as a table number, a staff member type (such as waiter, bus boy, manager, etc.), a staff number, etc.

Through the combined use of patron presence detector 20 (from FIG. 2) located at each table, patron counters 30 (from FIG. 3) located at each table, staff presence detector 40 located at each table, and staff transmitter 46 carried by each staff member, it is now possible to know unobtrusively when patrons sit at a table, how many patrons are at the table and when and for how long the patrons are being tended to by a staff member. Although patron presence detector 20, patron counter 30, and staff presence detector 40 are shown as separate units, it is also possible to combine patron presence detector 20, patron counter 30, and staff presence detector 40 within a single unit, if necessary. For example, staff presence detector 40 may be incorporated within patron presence detector 20 of FIG. 2 (and patron counter 30 of FIG. 3) such that processor 41, transmitter 43, antenna 44, register 48, and battery 47 are the same as processor 21, transmitter 23, antenna 24, register 26, and battery 25 from FIG. 2, respectively. Information gained from these detectors can be used to alert staff members regarding customer service needs through local area paging via a paging receiver carried by the staff members. Such paging receiver may also be incorporated within a staff transmitter.

E. Patron Survey Pad

Figure 5:
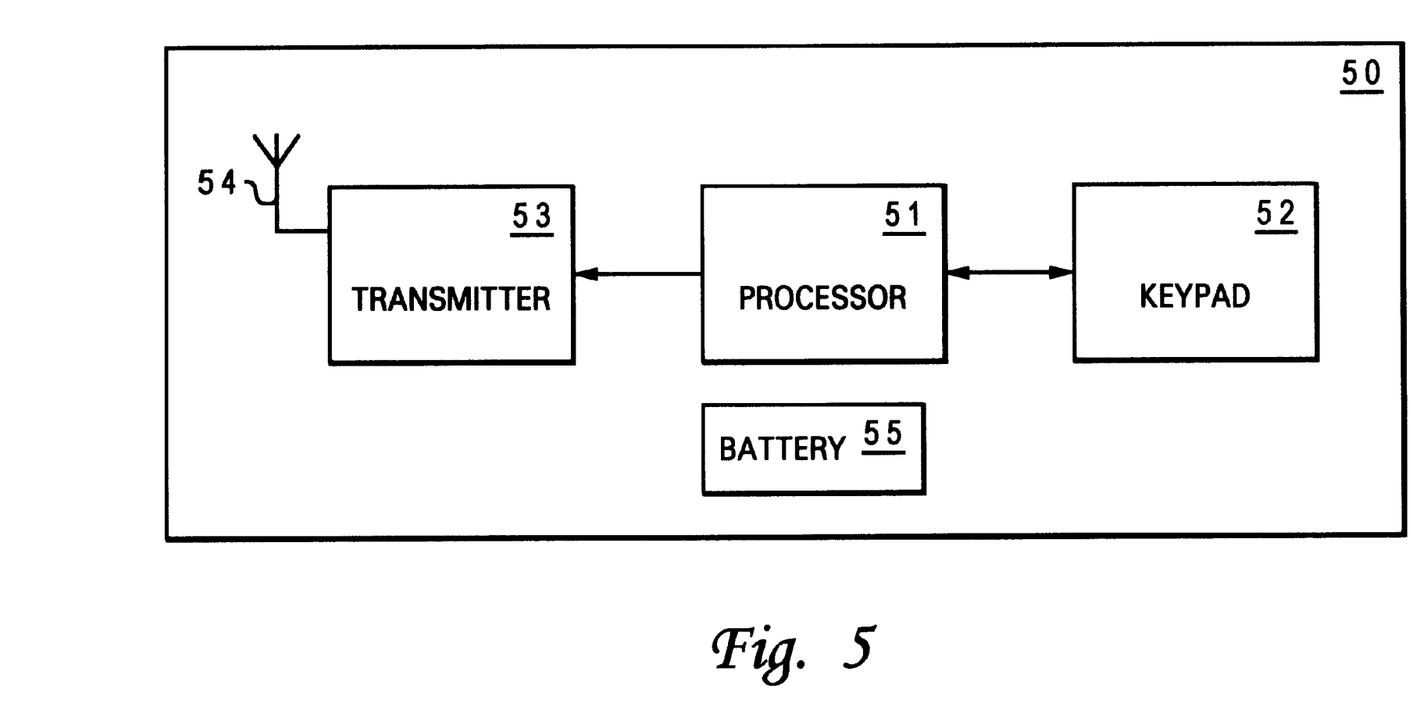
FIG. 5 is a block diagram of an electronic patron survey pad in accordance with a preferred embodiment of the present invention.

Yet another example of a sensor module is a patron survey pad that can relate to central computer 11 (from FIG. 1) qualitative and/or quantitative service input from patrons sitting at a particular table. Referring now to FIG. 5, there is illustrated a block diagram of a patron survey pad in accordance with a preferred embodiment of the present invention. As shown, a patron survey pad 50 includes a processor 51, a keypad 52, and a transmitter 53 along with an antenna 54. Patron survey pad 50 is preferably powered by a battery 55.

Patron survey pad 50 preferably transmits a "survey information" signal that is associated with the survey information selected by a patron. To a specific query, the response may include, for example, Excellent, Good, Average, and Poor. The "survey information" signal transmitted by patron survey pad 50 depends on which button of keypad 52 the patron presses. There could be any number of possible queries and possible responses. After a response has been entered by the patron, patron survey pad 50 transmits a "survey information" signal to receiver 42 (from FIG. 4), and transmitter 43 (from FIG. 4) in turn transmits the "survey information" (with a table number added by processor 41) to central computer 11 (from FIG. 1).

A "survey information" signal preferably includes a header and a body. The header may be an 8-bit pattern that is distinguishable from RF random noise or white noise. The body may be any length to include information such as survey result from a patron along with the table number, etc.

There are many methods in which staff information can be associated with the "survey information" signal. The preferred method is to utilize the table number at which a staff member has previously been identified as the server for that table, and stored within central computer 11.

Figure 6:
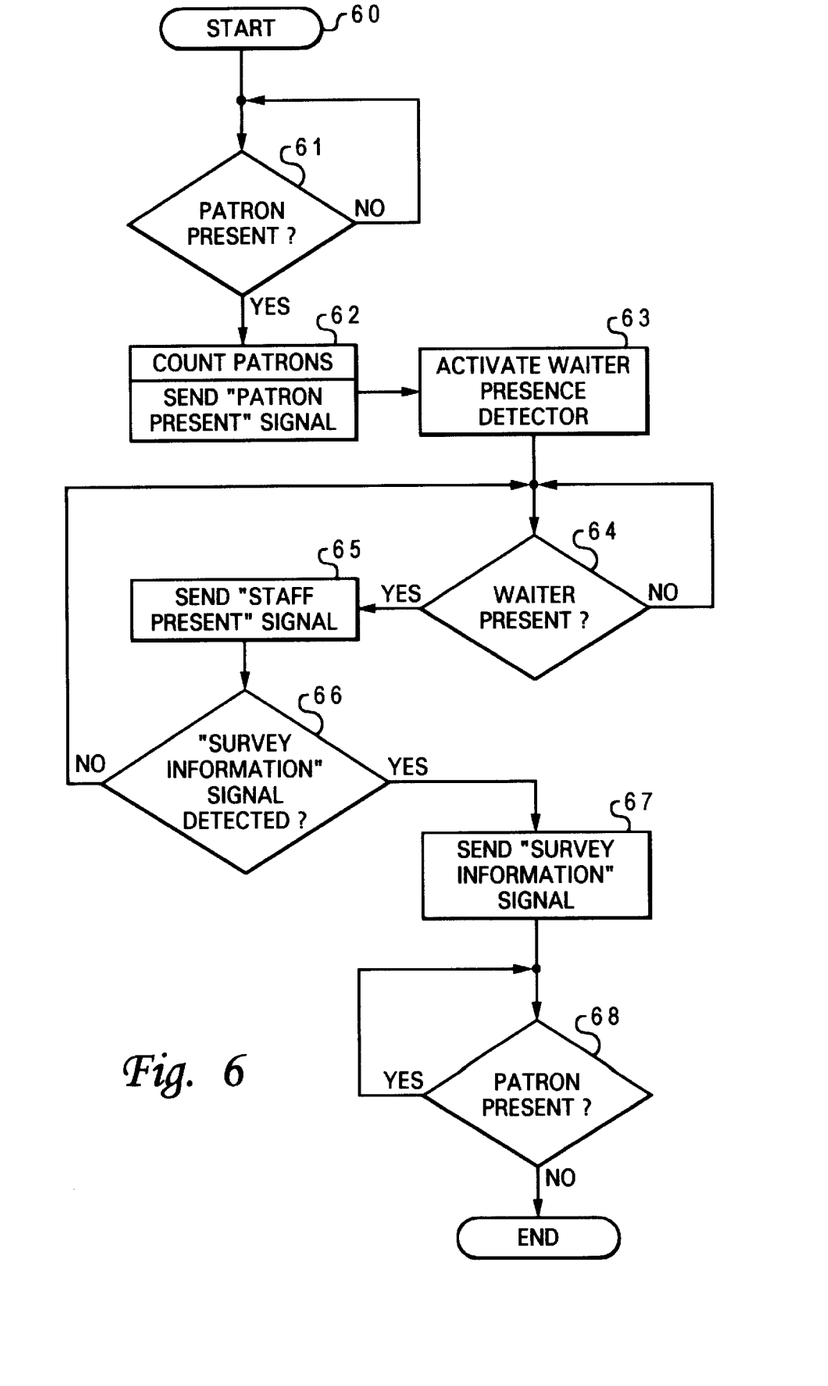
FIG. 6 is a high-level logic flow diagram of a method for monitoring service quality of a restaurant, in accordance with a preferred embodiment of the present invention.

With reference now to FIG. 6, there is illustrated a high-level logic flow diagram of a method for monitoring service quality of a restaurant, in accordance with a preferred embodiment of the present invention. Starting at block 60, a determination is made, by a patron presence detector, as to whether or not a patron is present at a table, as shown in block 61. The polling continues until a patron is detected at the table. Once a patron presence is detected, the patrons are counted and a "patron present" signal is transmitted to a central computer, as depicted in block 62, and a staff presence detector is activated, as illustrated in block 63. The "patron present" signal may include a table number and the number of patrons.

Next, another determination is made, by the staff presence detector, as to whether or not a staff member is present at the table, as shown in block 64. The polling continues until a staff member is detected at the table. Once staff presence is detected, a "staff present" signal is transmitted to the central computer, as depicted in block 65. The "staff present" signal should include at least a staff type, such as waiter, bus boy, manager, etc., a staff number and the table number.

After this point, the patrons should be placing their orders, waiting for their food, consuming their food, etc. Once the meal has been completed, the patrons are presented with a check for the meal along with a patron survey pad. The patrons then have an opportunity to enter information according to the questions presented on the patron survey pad. The survey information from the patrons is then sent to the receiver at the table. After a "survey information" signal has been received by the receiver at the table, as shown in block 66, a table number is then added, and the "survey information" signal is subsequently transmitted from the table to the central computer, as depicted in block 67. The "survey information" signal should include at least the table number and the result of the survey. Since a staff member has previously been associated with the table number, the survey result can be associated with the appropriate staff member by simply utilizing the table number. The receipt of the "survey information" signal at the table is an indication that the meal is finished and the table is about to be vacated.

Before the presentation of the bill and the patron survey pad, the staff presence detector can be utilized to detect each time the staff attends to at a table, as shown in block 64. The number of "staff present" signals indicates the attentiveness of the staff, and such information can be displayed at the central computer for restaurant management purposes. Finally, a determination is made as to whether or not patrons are still sitting at the table, as depicted in block 68. The table is assumed to be vacated when patrons are not detected at the table.

As has been described, the present invention provides a smart table for monitoring service quality in a restaurant. With the present invention, it is possible to know unobtrusively when and how many restaurant patrons are seated at a table, how long they are present at the table, and when they are being tended to by a waiter. These types of information can be organized in such a way as to assist a restaurant manager in his/her decision making process. For example, through the application of some form of audio or visual alarms, a quick look at a computer monitor could alert the restaurant manager to a potential customer service problem in the making. Moreover, by allowing internet access to this information, the appropriate executives located off-site can be alerted to situations that require attention. In addition, historical data on server attentiveness may bey useful in training and evaluating wait staff. For example, it may be useful to be able to present the wait staff with waiter attentiveness information on a person-by-person basis. Also, as it is generally accepted that waiter attentiveness is both a hallmark of a good wait staff but also a key contributor to the success of a restaurant, it may be useful to track waiter attentiveness against restaurant sales to ascertain if sales trends can be attributed to changes in waiter attentiveness. It is understood by those skilled in the art that the above-mentioned information can be combined with other technology that is readily accessible, such as video cameras, point-of-sale systems, etc., to extend their benefits.

Although only four types of sensor modules are described in the present disclosure, other types of sensor modules that include cameras, temperature sensors, current detectors, etc., can be utilized to further the benefits of the present invention.

The present invention is also applicable to service-oriented businesses that are highly dependent on their employees to perform a service for their patrons. Examples of these types of service-oriented businesses include restaurants, hotels, daycare centers, nursing homes, assisted living centers, automotive repair shops, drug stores, health clubs, banking institutions, and hair salons. Other businesses relying on its labor force to a lesser degree, such as retail merchandise outlets, grocery stores, and supermarkets, will also benefit from better training, management, monitoring and management support of its employees.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A smart table comprising:

a patron presence detector for detecting information regarding the presence of a patron sitting at said table;

a staff presence detector for detecting information regarding the presence of a staff serving at said table; and a transmitter, coupled to said patron presence detector, for transmitting said detected information to a remotely located processing system.

2. The smart table of claim 1, wherein said staff presence detector is activated by a detection of the presence of a patron sitting at said table.

3. The smart table of claim 1, wherein said patron presence detector is battery operated.

4. The smart table of claim 1, wherein said staff presence detector is battery operated.

5. The smart table of claim 1, wherein said smart table further includes a patron counter for counting the number of patrons sitting at said table.

6. The smart table of claim 5, wherein said patron counter is activated by a detection of the presence of a patron sitting at said table.

7. The smart table of claim 5, wherein said patron counter is battery operated.

8. The smart table of claim 1, wherein said detected information is transmitted over-the-air.

9. The smart table of claim 1, wherein said detected information is transmitted via a wire connection.

10. The smart table of claim 1, wherein said detected information is displayed on a display monitor for a restaurant manager to review at said remotely located processing system.

\* \* \* \* \*

UNITED STATES PATENT AND TRADEMARK OFFICE
CERTIFICATE OF CORRECTION

PATENT NO.    : 6,580,360 B1
DATED         : June 17, 2003
INVENTOR(S)   : McKee et al.

It is certified that error appears in the above-identified patent and that said Letters Patent is hereby corrected as shown below:

Column 2,
Line 13, please delete the "(" between "description" and "of".

Column 5,
Line 19, please replace the word "detectors" with -- detects the --.

Signed and Sealed this

Thirtieth Day of September, 2003

JAMES E. ROGAN
*Director of the United States Patent and Trademark Office*